Nov. 19, 1963

J. A. KITTOCK 3,110,965

DEVICE TO AID PILOTS IN ENTERING AND MAINTAINING
A HOLDING PATTERN FROM A PRESET HOLDING FIX

Filed April 6, 1962

INVENTOR.
James A. Kittock
BY
Attys

United States Patent Office 3,110,965
Patented Nov. 19, 1963

3,110,965
DEVICE TO AID PILOTS IN ENTERING AND MAINTAINING A HOLDING PATTERN FROM A PRESET HOLDING FIX
James A. Kittock, 5120 Caroline Ave., Western Springs, Ill.
Filed Apr. 6, 1962, Ser. No. 185,662
2 Claims. (Cl. 33—1)

This invention relates to a new and improved device to aid pilots in entering and maintaining a holding pattern from a preset holding fix.

In the past years aircraft have been increasing in ever greater numbers. The number of commercial and private planes is constantly increasing and with this increase in aircraft is a corresponding increase in the numbers of plane passengers and amount of freight shipped by air. Airports are constantly being enlarged with greater facilities to handle more planes in lesser amounts of time. However, in spite of increased airport facilities there is still a crowding of airplanes around the airports all of which desire to land at approximately the same time. The officer in charge of airport control must determine the order of aircraft landing. The skies around a crowded airport are filled with airplanes unable to immediately land. It is thus an important function of the officer in charge of the field to determine where each airplane will be "stacked" or permitted to fly during the period of waiting time preparatory to landing. The crowding of such aircraft creates hazardous conditions conducive to collisions between aircraft. The area around an airport is divided into numerous sections constituting generally a number of square miles within which a waiting airplane may fly pending his permission to land. With the increasing aircraft the holding sections have been necessarily moved closely adjacent one another making it even more imperative that particular rules and regulations be followed regarding the flight of aircraft within each particular holding section. Each such sectional area is provided with a "holding fix" about which the aircraft may fly. More particularly waiting flight must be made in a predetermined flight pattern. The "holding fix" is in a predetermined location and constitutes a vertically disposed imaginary line. This line is identified to the pilots either by a single radio beam projecting upwardly from the ground, by the employment of intersecting radio beams from spaced positions to thereupon particularly confine the holding fix to a special location within the holding area, or by some physical marker located on the ground. The holding fix must be sufficiently prominent or evident that any pilot flying his craft across the fix will immediately become aware of its existence and thereupon commence movement of his craft in a particular manner to comply with regulations concerning the flying of craft within a holding section adjacent an airport. Recent regulations concerning holding areas have divided the area into quadrants or segments of slightly different sizes about the holding fix as a center. Particular rules govern the entry into the flight holding pattern about the holding fix depending upon which segment the aircraft passes through during its approach and entry into the holding section. The regulation flight holding pattern constitutes substantially an elongated oval shape, one long side of which passes through the vertically extending holding fix.

Various flight instruments are provided for pilots in the charting of courses to their destination. One such instrument includes a circular ring calibrated with arcuate degrees and being rotatable relative to an inserted chart to enable the pilot to follow a particular course and move the particular degree in alignment with a companion compass reading.

It is a principal object of the present invention to provide a flight holding chart for holding areas adjacent an airport which may be embodied within a degree calibrated rotatable ring so that a pilot entering a holding area will immediately know the quadrant or segment of his approaching direction and thereby immediately know what procedure to follow to gain entry into the prescribed elongated oval shaped holding pattern upon passing through the vertically disposed "holding fix."

An important object of this invention is the provision of a flight holding chart for holding areas carried within a rotating direction scale and having a fixed holding course point located adjacent the rotatable scale outside of the chart and cooperating with the chart to facilitate entry into a holding pattern.

Another important object of this invention is to supply a device for aiding pilots in entering and maintaining a holding pattern about a preset holding fix.

Still another important object of this invention is to equip a device for pilots for fixedly supporting a chart designating a holding pattern for aircraft to land and particularly advising the method of entering into the holding flight pattern regardless of the direction of entry into and across a holding fix forming one point on the holding pattern.

An object as set forth in the preceding paragraph in which there is further included a rotating degree calibrated ring movable relatively to the flight chart so that a pilot can easily orient his direction of flight to his compass reading and thereby know the proper mode of entering the flight holding pattern.

A further object as set forth in the preceding two paragraphs and including a stationary portion of the device positioned outside of the degree calibrated rotatable ring for designating a flight holding course for incoming aircraft.

Another important object of this invention is to provide a flight direction calculator with an insertable chart to aid an airplane pilot in holding his plane in a particular flight pattern preliminary to landing the airplane.

Another and still further important object of this invention is the provision of a flight charting instrument with a slot to slidably receive a flight scale and including a space beneath the slot to receive a holding chart which will not interfere with sliding movement of the flight scale and yet becomes fully visible with the flight scale removed from the instrument enabling a pilot to conform to regulations concerning the entry into and maintaining a holding pattern from a preset holding fix located within the area designated for holding aircraft preliminary to landing at an airport.

An object as set forth in the preceding paragraphs and including a rotatable ring having degrees calibrated around the 360° thereof and manually rotatable about the chart for holding a particular pattern while waiting for permission to land.

Other and further important objects and advantages will become apparent from the disclosures in the following specification and accompanying drawings.

Figure 1:
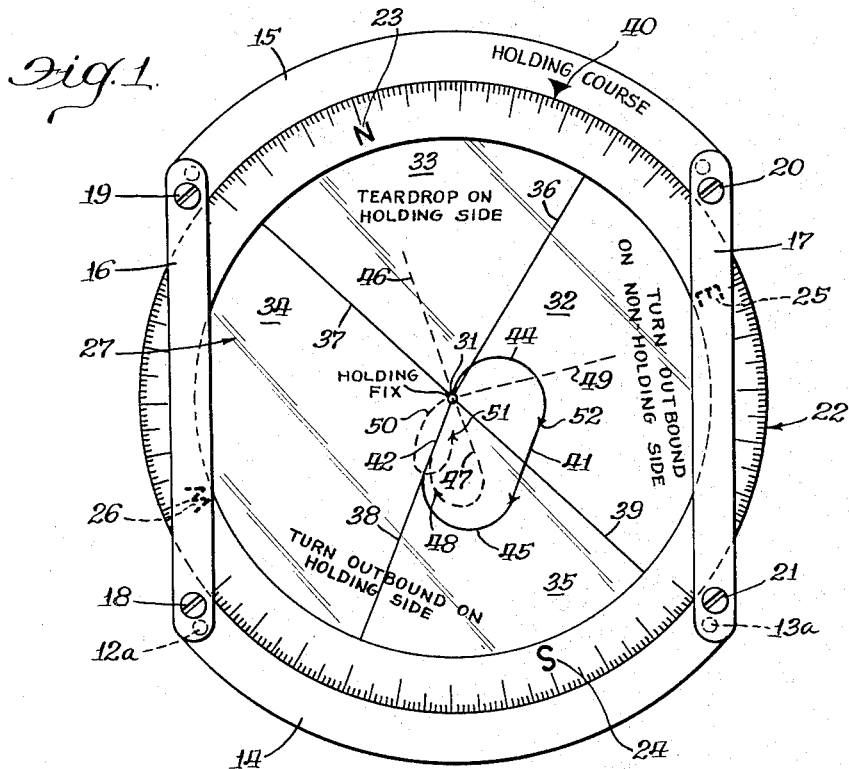
FIGURE 1 is a top plan view of the device of this invention.

The reference numeral 10 indicates generally a supporting structure which consists of a bottom plate 11, laterally spaced apart spacer elements 12 and 13, arcuate end rings 14 and 15 and interconnecting strap members 16 and 17. Screws 18 and 19 are adapted to hold the ends of the strap 16 integrally with the arcuate end rings 14 and 15 respectively. Similarly screws 20 and 21 are adapted to engage with the ends of the strap member 17 and hold them respectively to the arcuate ring members 15 and 14 respectively. The screws 18 and 19 extend down into the spacer member 12 and are threadedly engaged therewith. The screws 20 and 21 threadedly engage the spacer 13. Rivets 12a and 13a are adapted to hold the base plate 11 to the laterally spaced apart spacers 12 and 13. The supporting structure 10 is thus an integral unit when assembled as just described.

Figure 2:
FIGURE 2 is an end elevational view of the device as shown in FIGURE 1.

Mounted on the supporting structure 10 and rotatable relative thereto is a ring 22. The ring 22 is in the same general plane as the end disposed arcuately shaped rings 14 and 15. The inner arcuate surface of the end holding rings 14 and 15 are generally the same as the external arcuate surface of the rotatable ring 22. Further the rotatable ring 22 is equipped with calibrations of degrees around the full circumference thereof so that the ring is divided into at least 360°. The ring also includes direction designations, North as shown at 23, South as shown at 24, East as shown at 25, and West as shown at 26. When the instrument known as a dead reckoning computer is assembled as shown in FIGURES 1 and 2 the ring 22 is confined within the supporting structure as defined by the spacer members 12 and 13, the end arcuate rings 14 and 15 and the tie straps 16 and 17. The ring 22 may be freely manually rotated so that any portion thereof may be adjusted relative to any portion of the supporting structure.

A generally circular chart or card 27 is mounted on the base member 11 of the supporting structure 10 so that the chart is disposed laterally between ledges 28 and 29 formed integrally with and constituting lower inward extensions of the side spacers 12 and 13 respectively. Immediately above the chart 27 is a slot 30 extending throughout the length of the device as shown in FIGURE 1 and defined by the side spacer members 12 and 13. The slot is capable of receiving a flight scale not shown in the drawing but such as shown in U.S. Patents 2,756,929; 2,823,857; and 2,871,567. In the use of the device of this invention the flight scale is removed from the slot 30 so that the chart 27 is visible directly in the top plan view as shown in FIGURE 1 centrally of the rotatable degree calibrated ring 22. The chart 27 is stationary with the supporting structure 10 so that when the ring 22 is rotated it is rotated relative to the stationary chart.

The chart 27 is provided with a center point 31 which constitutes a holding fix. The holding fix 31 represents a vertical line defined as a particular location near an airport. There may be designated a number of such vertical line holding fixes near such an airport and each one is used by the flight control officer to "stack" planes coming in for landings at that airport. The holding fix may be designated by a particular longitude and latitude and may be identified by a radio beam directed vertically from a point on the ground, by the intersection of two radio beams, or by some physical marker on the ground.

The chart 27 has its holding fix 31 at the center thereof and about this center are designated a plurality of quadrant-like spaces or segments 32, 33, 34, and 35. These quadrant-like segments are not 90° quadrants but are rather close to that number of degrees. The quadrant-like space 32 approximates substantially 80° while the quadrant-like portion 33 constitutes 100°. The quadrant 34 is substantially 110° and the quadrant-like space 35 is substantially 70°. Quadrant dividing lines project radially outwardly from the holding fix 31 to the rotatable degree calibrated ring 22. The dividing line between the quadrants 32 and 33 is shown at 36. Similarly the dividing line between the quadrants 33 and 34 is shown at 37. The dividing line between the quadrants 34 and 35 is shown at 38 while the dividing line 39 is disposed between the quadrants 35 and 32.

The outer end holding ring 15 is provided with a fixed indicator 40 which constitutes a holding course and is so designated on this instrument. The holding course indicator 40 is in general alignment with the quadrant divider 38. The holding course indicator 40 is stationary as is the chart 27 and thus the degree calibrated rotatable ring 22 moves with respect thereto.

The chart 27 includes a flight holding pattern 41 which is an elongated oval shaped pattern about which planes are supposed to fly during a period of delay pending availability of an adjacent airport for landing. The long inside path of the holding pattern 41 designated by the numeral 42 lies on the quadrant divider 38 and thus the path of travel on this line 42 is divided between adjacent quadrants 34 and 35. The parallel or outside long track of the holding pattern 41 is shown at 43 and constitutes the outside of the holding pattern 41. The sides 42 and 43 of the holding pattern are joined by generally semi-circular ends 44 and 45. When a pilot is so instructed he must pass through the holding fix 31 and enter the holding pattern 41 in a particular manner and remain in this oval shaped flight pattern until such time as the airport officer permits landing.

The direction of approach to the holding fix determines the path of entry into the holding pattern 41. If the incoming position is on the quadrant dividing line 38 and heading toward the holding course indicator 40 the pilot is required to pass through the holding fix 31 and move directly into the holding pattern 41 by directing his plane around the curved end 44 and thence along the backside 43 of the oval shaped holding pattern 41. This same general entry path is followed when the aircraft enters the confines of the chart in either of the quadrants 34 and 35. The legend inscribed across these two quadrants is "Turn Outbound on Holding Side." For convenience the quadrant dividing line 38, which as previously stated is in alignment with the holding course indicator 40 and particularly the portion thereof including the elongated side 42 of the holding pattern 41, acts as the criterion for determining the holding or non-holding side. The holding side is construed to be within the holding pattern along the path 42 thereof. For example the segment or quadrant 33 has the legend "Teardrop on Holding Side." This means that an airplane crossing the holding fix 31 from any position within that quadrant such as shown by the dashed line 46 must in order to get into the flight holding path pass through the holding fix 31 and make a teardrop turn on the holding or inner side of the elongated path 42 of the holding pattern 41 as shown at 47. After making this teardrop turn the plane moving in the direction of the arrow 48 enters the elongated path 42 hence crossing the holding fix 31 a second time and then remaining in the elongated oval pattern 41. In the segment or quadrant 32 there is the legend "Turn Outbound on Non-Holding Side." Any aircraft approaching the holding fix 31 from a position within this segment 32 will have to pass through the holding fix and make an outbound turn outside the pattern 41 or in other words turn outbound on the non-holding side. An example of this path of travel is shown by the dashed line 49 in the segment 32 which passes through the holding fix 31 and makes an outbound turn as shown at 50 thereafter coming into the elongated path 42 as shown by the arrow 51.

In segments 34 and 35 there appears the legend "Turn Outbound on Holding Side." In the approach of aircraft through either of the segments 34 or 35 the planes merely enter the elongated path 42 and pass through the holding fix 31 and follow the holding pattern 41 in the direction of the arrows 52. The legend thus means the planes entering from those quadrants will, after passing through the holding fix 31, turn outbound around the end curve 44 of the elongated oval shaped pattern 41 and thence follow the pattern 41 as indicated by the arrows 52.

The segments or quadrants 32, 33, 34 and 35 have been described in considerable detail inasmuch as they constitute the means by which the plane operator changes his rules upon entry into a holding pattern of flight. The different legends appearing in each of the segments have been identified and the movements of planes through these segments and into the holding pattern have been specifically described. Further the quadrant dividing line 38 has been identified with the holding course that the planes should preferably be taking upon entering into the flight holding section which encompasses all of the area surrounding the holding pattern 41 and the included quadrants or segments utilized to gain entry into the pattern. The spaces 32, 33, 34 and 35 have been called segments or quadrants. Ordinarily a quadrant indicates a 90° segment of a circle whereas in the present instance the chart includes four slightly unequal segments about the central holding fix 31. The segment 32 constitutes approximately 80°, the segment 33 constitutes approximately 100°, the segment 34 constitutes approximately 110° and finally the segment 35 constitutes approximately 70°. This unequal dividing of quadrant degrees aids in the proper entry of aircraft into the holding pattern upon following particular rules from each of the segments. However, the quadrant dividing lines 37 and 39 constitute a straight line or diameter of the generally circular chart 27 and the directions for entering the holding pattern 41 are the same throughout both of the included segments 34 and 35. Thus there are really only three methods or procedures for entering the holding pattern. The reason for dividing the segments 34 and 35 into two parts as shown is to particularly locate the holding pattern at a desired angle with respect thereto and to have the quadrant dividing line 38 act as a holding course in conjunction with the holding course indicator 40 located on the outside of the rotating degree calibrated ring 22.

The mechanism for holding the circular chart 27 relative to the stationary supporting structure and relative to the included degree calibrated rotating ring permits easy use by pilots of aircraft in the entry of flight holding patterns when the occasion arises. The spacer ledges 28 and 29 of a rigid material form guides for the positioning of the chart 27 centrally of the supporting structure 10 and further constitute spaced ledges for the larger slot 30 through which flight calculating cards may be passed and used with the degree calibrated rotating ring during the normal course of flight. Only when the aircraft is preparing to land and has been ordered to remain about a particular holding fix 31 is the flight card removed from the slot 30 and the chart 27 used with the appurtenances of the present instrument. Regardless of the direction of travel of the plane the pilot may adjust his degree calibrated rotatable ring 22 to any desired position relative to the chart and to the holding course indicator 40 to effect proper entry into and maintenance of the holding flight pattern 41.

The chart 27 may be fixedly attached to the base 11 of the supporting structure 10 or it may be slidably removable therein between the spacer ledges 28 and 29. In either event the flight instrument may be used with slidable, elongated flight cards which pass through the slots 30 disposed within the supporting structure 10 at a position above the normal location of the chart 27 of this invention.

I am aware that numerous details of the construction may be varied through a wide range without departing from the principles disclosed herein and I therefore do not propose limiting the patent granted hereon otherwise than as necessitated by the appended claims.

What is claimed is:

1. An instrument for airplane pilots comprising a base member, side spacer members having inwardly facing stepped surfaces, said spacer members fixedly mounted on said base, a generally circular flight holding chart carried on said base between the lower of said stepped surfaces of said side spacer members and disposed below the upper of said stepped surfaces, a degree calibrated rotatable ring mounted over said spacer members and encircling said flight holding chart, arcuate end sections mounted on said side spacer members, tie straps joining said arcuate end sections and extending across side portions of said rotatable ring, removable fastening means joining said tie straps, arcuate end sections and said side spacer members to thereupon confine said rotatable ring for rotation within said instrument, a holding course indicator on one of said arcuate end sections, and the space between the upper of said stepped surfaces defining an unobstructed slot in the instrument above said chart.

2. In a hand operated calculator, a base member, a first disc having first certain indicia thereon, a centrally open second disc having second certain indicia thereon and rotatively carried in said first disc for cooperation between said first and second certain indicia, a pair of members, each of said members having stepped longitudinal sides, securing means carrying said pair of members in a spaced apart relationship to each other between said base member and said first disc with said stepped longitudinal sides facing each other, one portion of said stepped longitudinal sides defining a sliding area of a certain width, a card having third certain indicia thereon, said card having a width substantially equal to the distance between another portion of said stepped longitudinal sides so that said card is fixedly positionable between said another portion of said stepped longitudinal sides for cooperation through said central opening of said second disc between said first, second and third certain indicia.

References Cited in the file of this patent

UNITED STATES PATENTS 2,756,929    McGee _____ July 31, 1956

OTHER REFERENCES

Johnson copyright IP 5731, Sept. 18, 1961; copy available from Library of Congress, copyright div., or Div. 66.

ATM Circular No. 50, Federal Aviation Agency, June 6, 1961. See section entitled "New Aircraft Holding Pattern Procedures." Copy available in Div. 66.